United States Patent [19]

Takriti et al.

[11] Patent Number: 5,974,403
[45] Date of Patent: Oct. 26, 1999

[54] POWER TRADING AND FORECASTING TOOL

[75] Inventors: Samer Takriti; Liliam Shiao-Yen Wu, both of Chappaqua, N.Y.

[73] Assignee: International Business Machines Corporation, Armonk, N.Y.

[21] Appl. No.: 08/897,808

[22] Filed: Jul. 21, 1997

[51] Int. Cl.[6] .................................................. G06F 17/60
[52] U.S. Cl. ........................ 705/412; 705/10; 702/180
[58] Field of Search .............................. 705/10, 412, 400, 705/7; 702/179, 181, 180

[56] References Cited

PUBLICATIONS

Robert F. Engle, Scott J. Brown and Gary Stern, A Comparison of Adaptive Structural Forecasting Methods for Electricity Sales, Journal of Forecasting, vol. 7, 149 172 (1988).

Michael R. Veall, On Estimating the Effects of Peak Demand Pricing, Journal of Applied Econometrics, vol. 1, No. 1, 1986.

*Primary Examiner*—Edward R. Cosimano
*Assistant Examiner*—William Brian Edge
*Attorney, Agent, or Firm*—Whitham, Curtis & Whitham; Stephen C. Kaufman

[57] ABSTRACT

A computer implemented tool forecasts the spot price of electric power in a deregulated market and the amounts of power that may be traded in this market. Using generating capacities of multiple utilities, price functions, weather forecasts, and transmission variables, the computer implemented tool makes these forecasts at different delivery points, providing the decision maker with probabilistic distributions for spot prices and trading.

12 Claims, 6 Drawing Sheets

THE COST FUNCTION OF
A GENERATOR

FIG.3A

THE APPROXIMATE LINEAR
COST FUNCTION

FIG.3B

AGGREGATING THE GENERATORS OF A UTILITY INTO A PIECEWISE FUNCTION

POWER TRADING AND FORECASTING TOOL

CROSS REFERENCE TO RELATED APPLICATION

This application is related in subject matter to U.S. patent application Ser. No. 08/869,561 (IBM Docket YO997-032) filed Jun. 5, 1997, by Samer Takriti for "RISK MANAGEMENT SYSTEM FOR ELECTRIC UTILITIES" and assigned to a common assignee. The disclosure of application Ser. No. 08/869,561 is incorporated herein by reference.

DESCRIPTION

BACKGROUND OF THE INVENTION

1. Field of the Invention

The present invention generally relates to computer implemented forecasting tools and, more particularly, to a tool for forecasting the spot-market prices of electric power and the trading transactions at different delivery points.

2. Background Description

Electricity is an essential part of our lives. If we took a moment to think of the services that would not exist if electricity were not available, we would be amazed. Almost every aspect of our modern lives involves electric power, from light bulbs and television sets to hospitals and automobile industries. Although we are used to having power whenever we need it, the processes and systems involved in delivering electricity require careful planning and sophisticated mathematical and forecasting models.

Lately, due to rising costs of energy and discrepancies in its price among different regions of the country, the legal framework surrounding the electric-power industry has changed. This change has opened the door for utilities to compete with each other and against independent suppliers regardless of their geographic location. Although this change will benefit the consumer, utilities are going to face a highly unpredictable market and will need to make tough decisions regarding power generation and delivery.

The power industry is going through deregulation. The current picture of a single utility controlling the market in a specific region will soon disappear. Instead, there will be power producers who sell their product to a power pool; and power suppliers who will buy power from this pool and in turn sell it to their customers. Although the full picture of the power industry after deregulation is not yet known, it is clear that utilities need to prepare themselves for an open market in which buying and selling power are to be considered when scheduling their generating units.

The main reason behind deregulation is to reduce the high price of electric energy. Initial steps towards deregulation were taken in 1978 with the passage of the Public Utilities Regulatory Policy Act. This act encouraged nonutility generation and required utilities to buy power from independent generators. The Energy Policy Act of 1992 took deregulation a step further by mandating open access to the transmission system for wholesalers.

Currently, electricity is sold as a service that is delivered to specified points. For example, each one of us expects to receive electric power via a meter outside the house. We pay for this service regardless of its producer or which power lines it followed. That is, an electricity bill indicates the total usage of electricity in kilowatt hours (KWH) and the service price per KWH without incorporating any other details into the pricing scheme. Deregulation is changing this picture by unbundling the electric power into generation and transmission. In the future, one will pay a production cost and a transmission fee. There will be several power suppliers from whom electric power may be purchased. Suppliers may have different pricing mechanisms. For instance, there might be a discount for using power off-peak periods or for signing a long-term contract with the supplier. Power producers will compete with each other to minimize their costs so that they can sell their product to more customers and maximize their profit.

The hope is that deregulation will result in cheaper prices and play a part in improving the economy by encouraging investments in electric utilities. The size of the electric industry is expected to grow after deregulation as was the case with the telecommunications industry. The telecommunications industry's revenue shot up from $81 billion to $170 billion within ten years of deregulation.

A pitfall of deregulation is that the load on a utility system is becoming increasingly unpredictable. The reason is that trading transactions can change the load pattern significantly. For example, some utilities may sell more than 30% of their power generation to other utilities on certain days. Demand and supply in the market are functions of volatile electricity prices which in turn depend on highly unpredictable elements such as regional weather conditions and fuel prices.

There are two components for any competitive environment: physical and commercial. In the case of electricity, the physical component already exists in the form of transmission lines and all consumers have physical access to the market. The commercial component consists of the ability of buyers and suppliers to execute trades over the physical network. One should also ensure that anyone who is interested in joining this market has non-discriminatory access to the physical network. In this environment, suppliers and consumers have the freedom to contract with each other under negotiated terms and conditions. To ensure the delivery of the power traded, they need a mechanism to ensure the physical delivery of the electricity. Also, they may need to rely on a spot market to buy or sell additional electricity.

Although the new environment encourages competition, power transmission will remain regulated for the time being in order to maintain a reliable system. The transmission lines in each state or region will be controlled by an independent entity called Independent System Operator or ISO. One of the ISO responsibilities is to settle financially with the parties involved in transmitting electric power. The transmission cost depends on the proximity of the supplier and the congestion of the transmission lines as well as other operational factors. To maintain a reliable system, ISO announces, twenty-four hours in advance, the load forecast on the system and asks interested suppliers to submit bids; i.e., amount of power to be delivered at each point and pricing information. The load forecast is given for each delivery point within the physical system.

Bids are submitted to the Power Exchange or PX which then holds an auction to determine which suppliers to buy power from. For each delivery point, the PX chooses the least expensive source of power, then the second least expensive, and so on. The process is repeated until the forecasted load on the system is met. Note that the previous process ensures that the customers' need for electricity is satisfied at a minimal cost. The bidding cost of the last supplier chosen in the bidding process is the spot-market price for power at this delivery point. The PX performs this process for each delivery point in the system and at each hour of the day.

After agreeing on the production schedule, the ISO studies the schedule to make sure that it is feasible; i.e., it does not exceed the capacity of the transmission lines. Transmission charges are a function of the congestion of the power lines. These charges are calculated by ISO and billed to the different parties involved in trades.

Note that suppliers who submit a bid with a high price may end up not selling any of their production. On the other hand, selling power at a low price may not create enough revenue for a generator. Given that no one knows in advance the amount of power that competitors may bid for, the electric-power market will become more uncertain and risky. The hope is that competition will force utilities to minimize their production costs which will, in turn, benefit consumers and the economy in general. The previous model also encourages individuals to invest money in the electric-power market. For instance, if the charges across a certain power line are relatively high due to congestion, an investor could build an alternative power line in the hope of benefitting from the high-traffic in that region. The result, of course, is a reduction in the transmission cost in that region and an increase in the reliability of the system.

SUMMARY OF THE INVENTION

It is therefore an object of the invention to provide a tool for forecasting the spot price of electric power in a deregulated market and the amounts of power that may be traded in this market.

The computer implemented process according to the invention forecasts the spot-market prices and the trading transactions at different delivery points, providing the decision maker with probabilistic distributions for spot prices and trading so that he or she can manage risk efficiently. The user of the process can be (1) a utility or an independent power supplier who is interested in using the trading and spot market information to decide which generating units to commit, how to price his or her power, and the level of generation needed; or (2) a power broker who is interested in buying and selling power (but not producing) in order to maximize his/her revenue. The computer implemented process uses the weather forecast in addition to other market information to provide probabilistic distributions for the power traded and spot-market prices. What distinguishes our tool from others is that it provides a distribution instead of a single estimate for the spot price and the power traded. For example, the computer implemented process may provide the user with Table 1 so that he or she can hedge against uncertainty in the market.

TABLE 1

| $ | MWH | Pr. |
| --- | --- | --- |
| 12.00 | −50 | 10 |
| 12.00 | −40 | 5 |
| 12.00 | −30 | 5 |
| 12.50 | −40 | 15 |
| 12.50 | −30 | 10 |
| 13.00 | −30 | 5 |
| 13.00 | −20 | 10 |
| 17.50 | 40 | 5 |
| 17.50 | 50 | 5 |
| 18.00 | 50 | 15 |
| 18.00 | 60 | 10 |
| 18.00 | 70 | 5 |

The first column represents the spot market price. The second column contains the amount of power that may be traded. Note that for the same spot price, one may buy or sell different amounts of electric power. The likelihood of a transaction is given in the last column.

Clearly, one would like to use all available historical, competitive, and weather information to produce the most accurate output. However, the data available for different utilities may differ from one region to another. For example, some utilities are required, by the power pool, to post the status of their generating units by the end of the week. These requirements differ significantly between power pools. Also, data that are currently public, such as hourly loads, may not be available in the near future.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
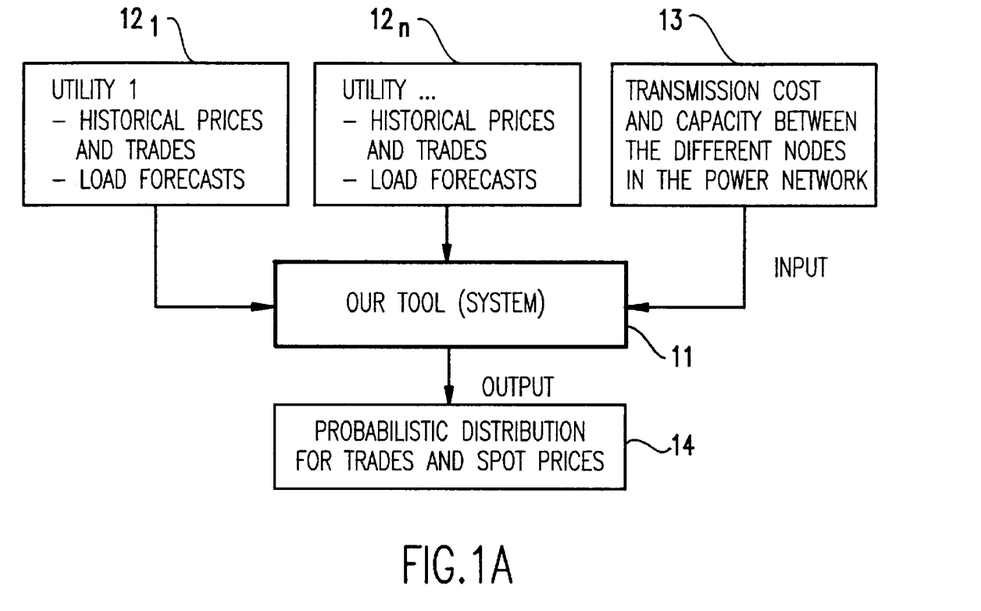
FIGS. 1A and 1B are block diagrams illustrating the relation of the power trading and forecasting tool according to the invention to its inputs and outputs.
Figure 1B:
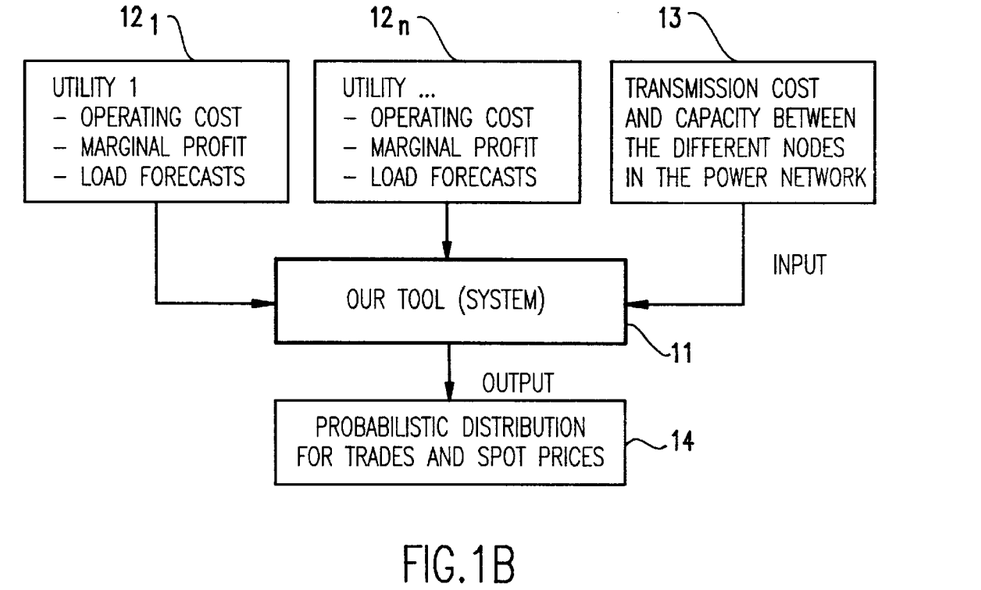

Referring now to the drawings, and more particularly to FIGS. 1A and 1B, there are shown in block diagram form the relationship of the power trading and forecasting tool according to the invention and its inputs and outputs. The tool can have different sets of input parameters, and two are described here by way of example. The first example is shown in FIG. 1A. In this case, we are given the historical data of selling prices and amounts of power sold by each utility. The tool 11 receives inputs from a plurality of utilities $12_1$ to $12_n$. These inputs include for each utility prices at which it sold power in the past and the corresponding amounts of power sold. In addition, the tool 11 receives as an input the transmission costs and the maximum transmission capacity for different lines in the transmission network 13. The output of tool 11 is the probabilistic distribution for trades and spot prices 14.

The second set of input parameters is illustrated in FIG. 1B. They include the operating cost curves of the different generators $12_1$ to $12_n$, estimates of the marginal profits, and electric load forecasts. The output is similar to that of FIG. 1A. The inputs and outputs of the tool 11 are described in more detail below.

System's Inputs

As we mentioned earlier, the final picture of the deregulated market is not well defined. Hence, the input parameters, data available about utilities and their generators, are not exactly known at this time. To avoid this difficulty, we describe the input parameters in general terms so that our tool can handle any electric power market. The input to our system consists of (1) the generating capacity and price functions, $f_{i,t}^s$, of utilities competing in the market, (2) the load forecast in the regions of interest, and (3) the transmission costs, $c_{(i,j),t}^s$, charged by the ISO to transmit electricity from node i to node j at time period t and the transmission capacity, $u_{(i,j),t}^s$. Note that all of our notations contain the superscript s. This is the scenario index, a concept that is described in some detail in the above referenced application Ser. No. 08/869,561 and which shall be clarified through the following discussion. Here is a detailed description of the input parameters.

1. The maximum generating capacity, $G_{i,t}^s$, of each utility, i, competing within the market. Note that this capacity is not necessarily the total generating capacity of all generators owned by a utility. For example, some units may be unavailable due to maintenance during certain days. Also, depending on the season and availability of fuel, the capacity may change. The scenario index, s, allows a certain utility to have different possible capacities. The capacity could also change depending on t over the planning horizon, usually one week or 168 periods. For example, the capacity over the weekends is lower than regular days.

2. The price functions, $f_{i,t}^s$ at which utility i is willing to sell its power at time t under scenario s. The value returned by $f_{i,t}^s$ is assumed to include the operating cost plus the profit margin of a utility. Note that $f_{i,t}^s$ may be given (a) implicitly or (b) explicitly.

The Implicit Case

We may not know the exact cost structure of a utility but may be able to approximate its operating cost by a quadratic function. For instance, we may observe that a utility, i, priced its power at time t and under a certain load at $\lambda_{i,t}^s$ $/MWH. By observing the price offered by a utility for its power over time, one may construct an approximation of the cost structure of this utility. The simplest way to do so is to collect the different data points of price versus load and fit a quadratic curve using least squares. Our experience indicates that the quadratic approximation is a good one for most utilities. Of course, if one observes a certain profile for the cost structure of a utility, one may consider a different function to be fit.

The problem of "guessing" the price function of a utility is not a simple one in a competitive environment. For example, one may observe a cost of $15 per MWH for a certain utility under a 12,000 MWH load on one day while observing an operating cost of $18 per MWH for the same utility under a similar load in another day. The reason for this discrepancy might be a generating unit that is going through maintenance, a failure of a generator in that utility, a large error in the load forecast which resulted in shortage of generation, or a shortage of certain fuel which may have forced the utility to use a more expensive fuel. Regardless of the reason, building the price function $f_{i,t}^s$ of a utility i may be impossible if one to use a single value for the cost under a given load. To handle this difficulty, our model permits the use of more than one price function, $f_{i,t}^s$, at any time period t. For a given time period t, we allow the price function to be any of the functions $f_{i,t}^1 \ldots f_{i,t}^s$ where $S_t$ is the number of different functions available at time t. That is, we model the cost function of a utility i at each time period t by a set of cost functions. The index s is read as scenario. One hopes that using a set of functions reflects accurately the uncertainty an observer may have regarding the operating cost of a utility. For example, one scenario may represent a normal operating environment, another might be the cost observed when natural gas prices are high, a third may be the price function when there is a heat wave in the area, and so on. One can use as many scenarios as needed so that uncertainty in f is approximated reasonably.

Given a set of observations, $\lambda_{i,t}^{j,s}$, j=1, ..., $J_{i,t}^s$, of the prices of utility i at time t under certain conditions s, we find the pricing profile that best-fits this utility using a least square approach. Here is a pseudocode of this process.

Initialization. Get a set of prices, $\lambda_{i,t}^{j,s}$, offered by utility i at time t under scenario s. Let $x_{i,t}^{j,s}$ be the amount of electricity generated by the electric utility for these price offers.

Least Squares. The approximating function must be quadratic, convex, positive, and increasing. To find the function that best-fits our data while satisfying the previous constraints, we solve the following quadratic program:

$$\min \sum_{j=1}^{J_{i,t}^s} \left( x_{i,t}^{j,s^2} a_{i,t}^s + x_{i,t}^{j,s} b_{i,t}^s + c_{i,t}^s - \lambda_{i,t}^{j,s} \right)^2 \quad (1)$$

$$\text{subjct to} \quad a_{i,t}^s \geq 0,$$

$$b_{i,t}^s \geq 0,$$

$$x_{i,t}^{j,s^2} a_{i,t}^s + x_{i,t}^{j,s} b_{i,t}^s + c_{i,t}^s \geq 0.$$

The previous optimization model can be solved efficiently using any quadratic programming approach. See, for example, R. W. Cottle, J. S. Pang, and R. e. Stone, *The Linear Complementary Problem*, Academic Press, 1992, and K. G. Murty, *Linear Complementarity, Linear and Nonlinear Programming*, Helderman Verlag, 1988.

Figure 2:
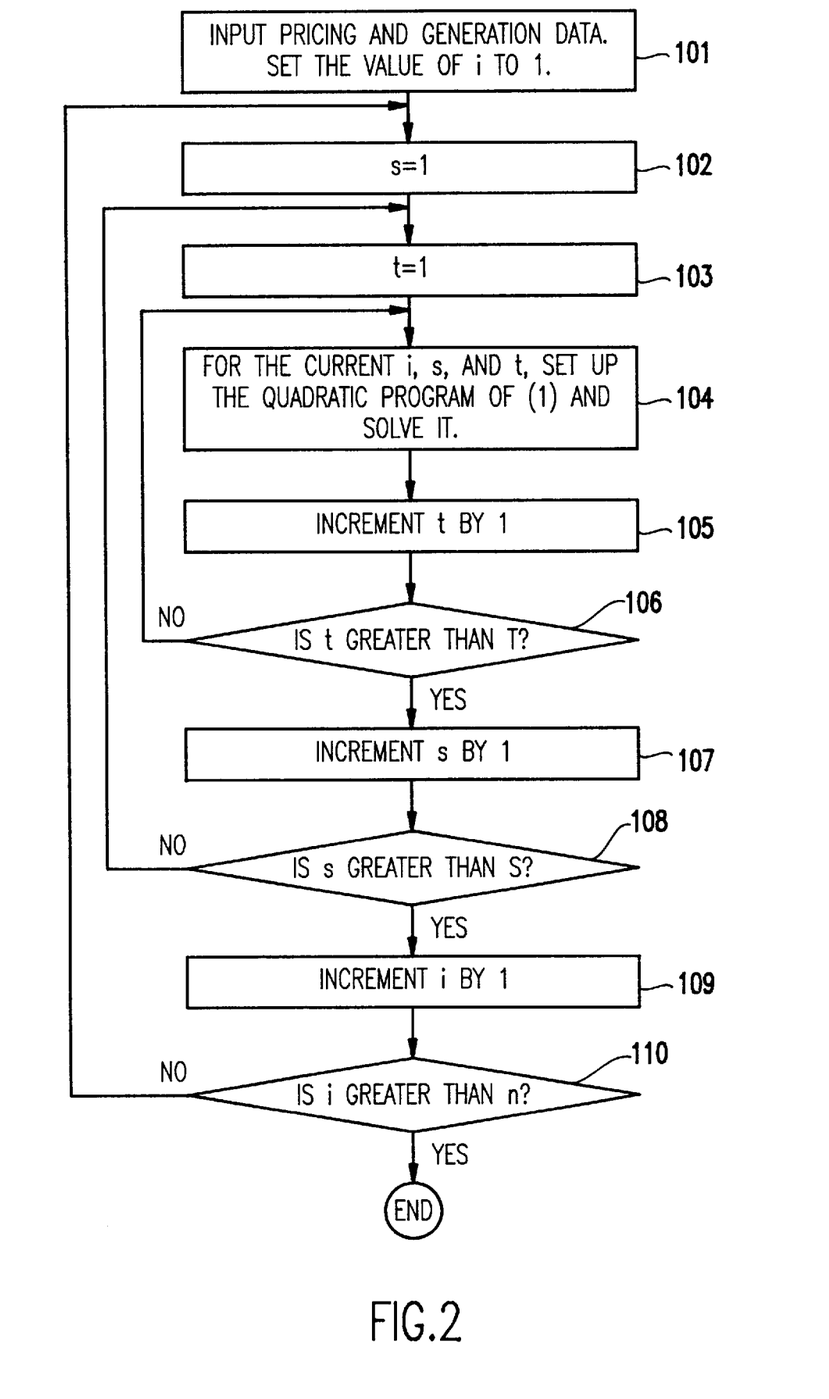
FIG. 2 is a flow diagram illustrating the process of approximating the price function of a utility by a quadratic function.

FIG. 2 shows a flow chart of the previous process applied to multiple utilities, 1, ..., n, multiple scenarios, 1, ..., S, and multiple periods, 1, ..., T. The process starts in function block 201 in which the input data is passed to this procedure. The input data are the historical prices, $\lambda_{i,t}^{j,s}$, j=1, ..., $J_{i,t}^s$, and the corresponding amounts of power generated, $x_{i,t}^{j,s}$. These data are usually available from the power pool and assumed to be stored on the hard disk of our computer. In many cases, such data are available through the World Wide Web (WWW). At this stage, the counter i is set to one. The process then moves to function block 202 in which the counter s is set to one. Function block 203 sets the value of t to one. The process then proceeds to function block 204 in which the quadratic program of equation (1) is constructed and solved. We do not discuss the solution approach here. Most optimization packages provide specialized routines for handling such problems. We suggest using the Optimization Subroutine Library of IBM which provides a specialized function, EKKQSLV, for this operation. As a result, we obtain the values of $a_{i,t}^s$, $b_{i,t}^s$ and $c_{i,t}^s$, which are used to approximate the price function, i.e., production plus profit margin, for any generation requirement. In function block 205, the value of t is incremented by one. Decision block 206 compares t with T. If $t \leq T$, the execution is directed to function block 204; otherwise, the execution proceeds to function block 207. In function block 207 the value of the scenario index s is increased by one. Decision block 208 checks if s is greater than S. If the answer is no, then the execution is directed back to decision block 203. Otherwise, the execution continues to function block 209. In function block 209, the value of i is incremented by one. Decision block 210 directs the flow to function block 202 if i is less than or equal to n; otherwise, the process terminates. As a result, we obtain a set of quadratic functions that can be used to approximate the price functions under different scenarios and during different time periods.

The Explicit Case

The second case we discuss is that in which the price function is known explicitly. That is, for each generating unit owned by utility i, we know the operating range, the cost function within that range, the start-up cost, and any other characteristics relevant to a generator. We may also know the status of each generator. That is, we know if a generator is scheduled for maintenance and if it is unavailable due to mechanical problems. Furthermore, one may have historical information regarding the probability of failure of each unit. All of the previous information implicitly represents the cost structure of a utility. That is, we do not have an explicit representation of $f_{i,t}^s$ but we can compute the value of $f_{i,t}^s$ given the load and conditions of the generators. Note that in the current electric-power industry, the previous data are known to the general public. It is available on the World Wide Web and can be obtained in the form of a database stored on a floppy disk. However, due to competition, this information will not be available in the near future in which case we need to rely on the implicit representation mentioned above.

Figure 3A:
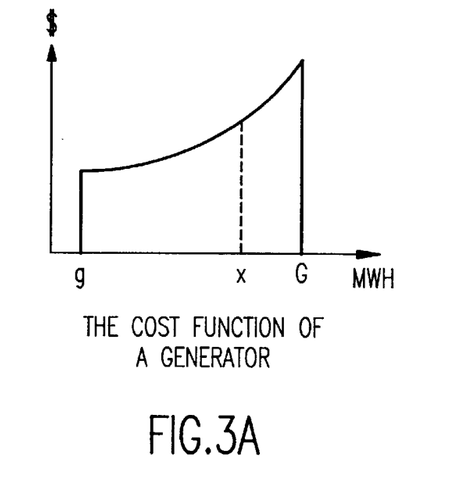
FIGS. 3A and 3B are graphs demonstrating how the cost function of a generator can be approximated using a linear function.
Figure 3B:
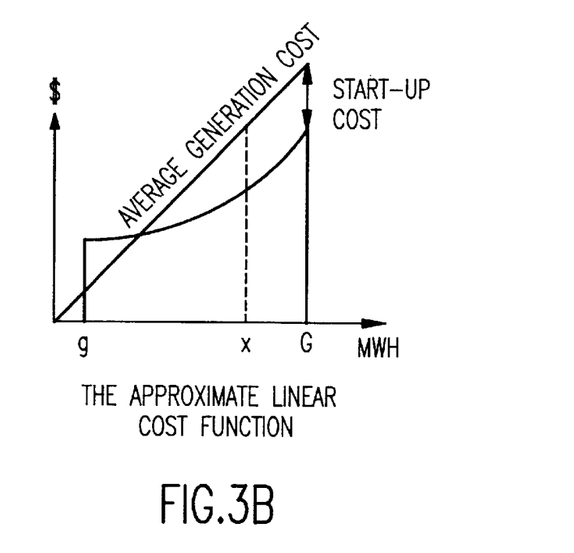
Figure 4:
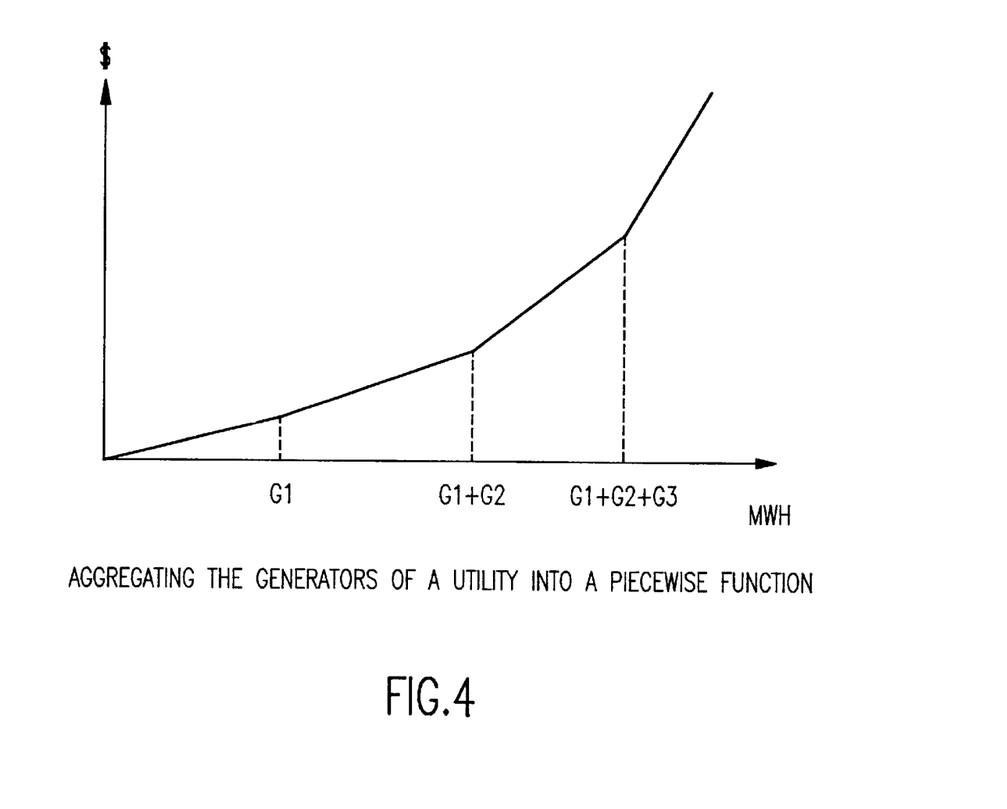
FIG. 4 is a graph showing an approximate cost function of a utility constructed by using the linear approximations of FIG. 3.

To build a set of functions, f, that approximate the cost structure of a utility under different circumstances, we sort the generators in the increasing order of their average generating cost. This is done by adding the start-up cost of a unit to its operating cost at the maximum operating level and dividing by its maximum operating level. To clarify the previous approximation, the cost function of FIG. 3A is used. To approximate this function, the start-up cost is added to the value of the function at the maximum operating level, G. Then, the average cost of this unit is computed by dividing the new cost at G by G. As a result, a generator has a linear cost function that passes through the origin and its operating range is anywhere between 0 and G (see FIG. 3B). The generating units are sorted in the increasing order of their average costs which results in a convex piecewise linear function for operating the system of a utility. FIG. 4 shows an example of such a function. The first, i.e., cheapest, generator is used to cover the load between 0 and its maximum capacity, $G_1$. The second most economic generator is used to meet the electric load between the additional load up to the capacity of the second generator. That is, it covers the load between $G_1$ and $G_1+G_2$. The process is repeated until all the generating units of a utility are incorporated into the system. Note that we can build different functions to reflect the different operating conditions of a utility. For example, if some generators are not available, then we have a different function. Another example is the case in which a generator uses gas as its primary fuel. In this case, the cost function can be affected by gas prices in the market. Hence, we can create different functions (and different approximations) to model different market conditions.

Note that the resulting function is an approximation of the cost function of a utility and not its price function. To obtain the price function from the cost function we need to estimate the profit margin of a utility. The goal of any deregulated market is to force the competing entities to reduce their cost. The minimum cost at which a utility can sell its production, without losing money, is the production cost of its electricity. However, this pricing scheme does not generate any profit to the utility. To avoid the problem of zero profit, each competitor usually sets a profit margin that is acceptable for him or her. This profit margin may be different for the different periods, t, of the planning horizon and under the various scenarios. For example, a profit margin of 1% may be acceptable in periods in which the market demand is low while a higher margin might be desirable if the demand is high. The margin can also change with the scenarios s. For example, if fuel prices are high, one may not be able to enforce high profit margins.

The profit margin information is assumed to be stored on the hard disk of a computer so that it can be accessed by the process of this invention when needed. The price function is then obtained by adding a linear term that takes into consideration the profit margin resulting in $f_{i,t}^s$.

To reflect the importance of each scenario and to make the model more complete, a probability is associated with each scenario s. That is, a probability, $p_t^s$, is associated with each price function that reflects the likelihood of its occurrence in the future. The value of $p_t^s$ can be approximated using the frequency of each of the functions $f_{i,t}^1, \ldots, f_{i,t}^{s_1}$ from the past. Of course, the user of the tool according to this invention may adjust these probabilities using his or her intuition if there is a need to do so. These probabilities in addition to the parameters representing the functions $f_{i,t}^s$ are assumed to be stored on the computer hard disk.

3. Using the weather forecast, create a load forecast for each utility of interest. Usually, these tools require historical data for the load on the system of a utility and the corresponding weather conditions, i.e., maximum and minimum temperature during the day. Table 2 shows an example of this data.

TABLE 2

| | | Load vs. Weather Data | | | |
|---|---|---|---|---|---|
| Date | Max | Min | 1 | 2 | 3 | ... |
| 5/25/95 | 65 | 43 | 2101 | 2090 | 1045 |
| 5/26/95 | 68 | 44 | 2173 | 2120 | 1932 |
| 5/27/95 | 74 | 53 | 2318 | 2292 | 2056 |

The first column is the date, second column is the maximum temperature over the twenty-four hours of that day, and the third column is the minimum temperature during that day. The next twenty-four columns (only three are shown) provide the electric load in MWH at each hour of the day. By passing this data to a forecasting tool, it can create a model that correlates the maximum and minimum temperatures to the load. These tools are also capable of incorporating the effect of time of day and day of year into the forecast. The historical data of any utility can be obtained in an electronic form from the power pool. In the future, the electric load of a delivery point, i.e., geographic region, will be posted on the World Wide Web. We do not discuss the forecasting process in this document. See, for example, R. H. Shumway, *Applied Statistical Time Series Analysis*, Prentice-Hall (1988), and A. C. Harvey, *Forecasting, Structural Time Series Models and the Kalman Filter*, Cambridge (1991). Note that the forecast is given usually for each hour of the coming week. The forecasting tool also provides a probabilistic distribution, i.e., mean and standard deviation, for the load at each hour. That is, using the weather forecast, one can obtain for each utility a probabilistic distribution for its load at each hour of the planning horizon. If the forecasting tool provides a continuous distribution for the load at each time period, the continuous distribution can be approximated by a discrete one. The number of discrete realizations at time t is assumed to be $K_t$. Each demand realization, $d_{i,t}^k$, i=1, ..., n, has a probability of $\pi_t^k$ that reflects the likelihood of its occurrence.

The weather forecast is usually available on the World Wide Web and can be imported by our system easily to pass it on to the forecasting system.

4. Transmission cost, $c_{(i,j),t}^s$, in the different power lines of the electrical system. Our notation permits changing the transmission cost from one period to another. It also allows using multiple cost scenarios depending on the status of the electric system. We assume that for each transmission line (i,j) we know the maximum transmission capacity MWH which we denote by $u_{(i,j),t}^s$. If a power line is not available during a certain period, we can set its capacity, $u_{(i,j),t}^s$, to zero. Note that we define a power line by its ends or nodes i and j. To simplify the task of representing the electric network and its delivery and generating points, we assume that there are n nodes in the network. Each node, i, is assumed to have a generating utility, i.e., a set of generators, associated with it and an external demand. Clearly, the upper capacity of the generating utility, $G_{i,t}^s$, at node i can be set to zero to model a demand center. For a generating node, the external load, $d_{i,t}^k$, can be set to zero. For transmittal or transshipment nodes, we set both generation and demand to zero.

The transmission cost and capacity are posted on the World Wide Web as required by the Federal Energy Regulatory Commission. We assume that our system can access the transmission costs and capacities for the different regions of interest.

Solution Approach

The computer implemented tool of this invention uses the probabilistic distributions of the electric load and of the cost function of each utility to build probabilistic distributions for the spot-market prices and for the electric trades in the system. Due to the use of discrete random variables, i.e., finite $S_t$ and $K_t$, one can consider all combinations of s and k at each hour. The problem of cost minimization while satisfying demand and profit margins is then solved for each one of these combinations to produce a spot-market price and to compute the trades. The results can be bucketed to form a distribution of the spot prices and trades. Given that the number of combinations at each time period is $S_t \times K_t$, it may be hard to perform all of the previous calculations in a reasonable time. Instead, one can sample from the electric-load and cost distributions to create a sequence of deterministic models. The sampling process (i.e., simulation) is an approximation of the exhaustive one described above. The sampling process is repeated until a reasonable approximation is reached of the distributions of trades and spot prices or until a maximum number, L, of samples is chosen.

Consider the market equilibrium at time t under a sample of price functions $f_i$, i=1, . . . ,n, transmission cost $c_{i,j}$, i=1, . . . ,n, j=1, . . . ,n, and loads $d_i$, i=1, . . . ,n. We drop the indices t, s and k to simplify notations. Due to the competition resulting from the bidding process, we expect the spot price to be the minimum cost at which the demand can be met while all suppliers satisfy their profit margins. In other words, one needs to minimize the cost of supplying power, $$\min \sum_{i=1}^{n} f_i(x_i) + \sum_{i=1}^{n} \sum_{j+1}^{n} c_{i,j} y_{i,j}. \qquad (2)$$

The decision variable $x_i$ represents the amount of power produced by supplier i while $y_{i,j}$ represents the amount of power flowing from i to j. Note that if two nodes are not connected directly with a transmission line, then the capacity of this line is set to zero. The minimization of (2) must be solved subject to Kirchhoff-law which requires that the total power flowing into a node must be equal to total power flowing out of this node. Mathematically, this condition is written as $$\sum_{j+1}^{n} y_{j,i} + x_i = \sum_{j=1}^{n} y_{i,j} + d_i, \qquad i = 1, \ldots, n \qquad (3)$$

where $d_i$ is assumed to be zero for nodes that do not have electric load and maximum generation, $G_i$, is zero for nodes that do not have any generation. To satisfy the transmission capacity, we require that $0 \leq y_{i,j} \leq u_{i,j}$, i=1, . . . ,n, j=1, . . . ,n. Also, given the maximum generating capacity of utility i, we must satisfy the constraint $0 \leq x_i \leq G_i$, i=1, . . . ,n. One can enforce other constraints such as the maximum capacity of a node.

Due to convexity, the minimization of (2) can be solved easily. See, for example, M. S. Bazaraa and C. M. Shetty, *Nonlinear Programming: Theory and Algorithms*, John Wiley & Sons, Inc., 1979. If the price functions, $f_i$, are quadratic, one can use a speedy quadratic programming approach as described by R. W. Cottle et al. and K. G. Murty, ibid. Note that by solving (2) one obtains the amount of power to be generated and transported from each supplier to each demand point. One also obtains the dual variables or the Lagrange multipliers associated with the constraints of equation (3). The dual variable associated with delivery point i represents the marginal cost of power at point i. That is, it is an estimate of the spot-market price at i under the given demand and price functions.

We repeat the previous process by sampling a new set of price functions and electric loads then resolving the model. The sampling process continues until changes in the distribution of spot prices and the decision variables $x_{i,j}$ are within a pre-specified threshold. Another possibility is to repeat the process for a fixed number, L, of samples.

Figure 5:
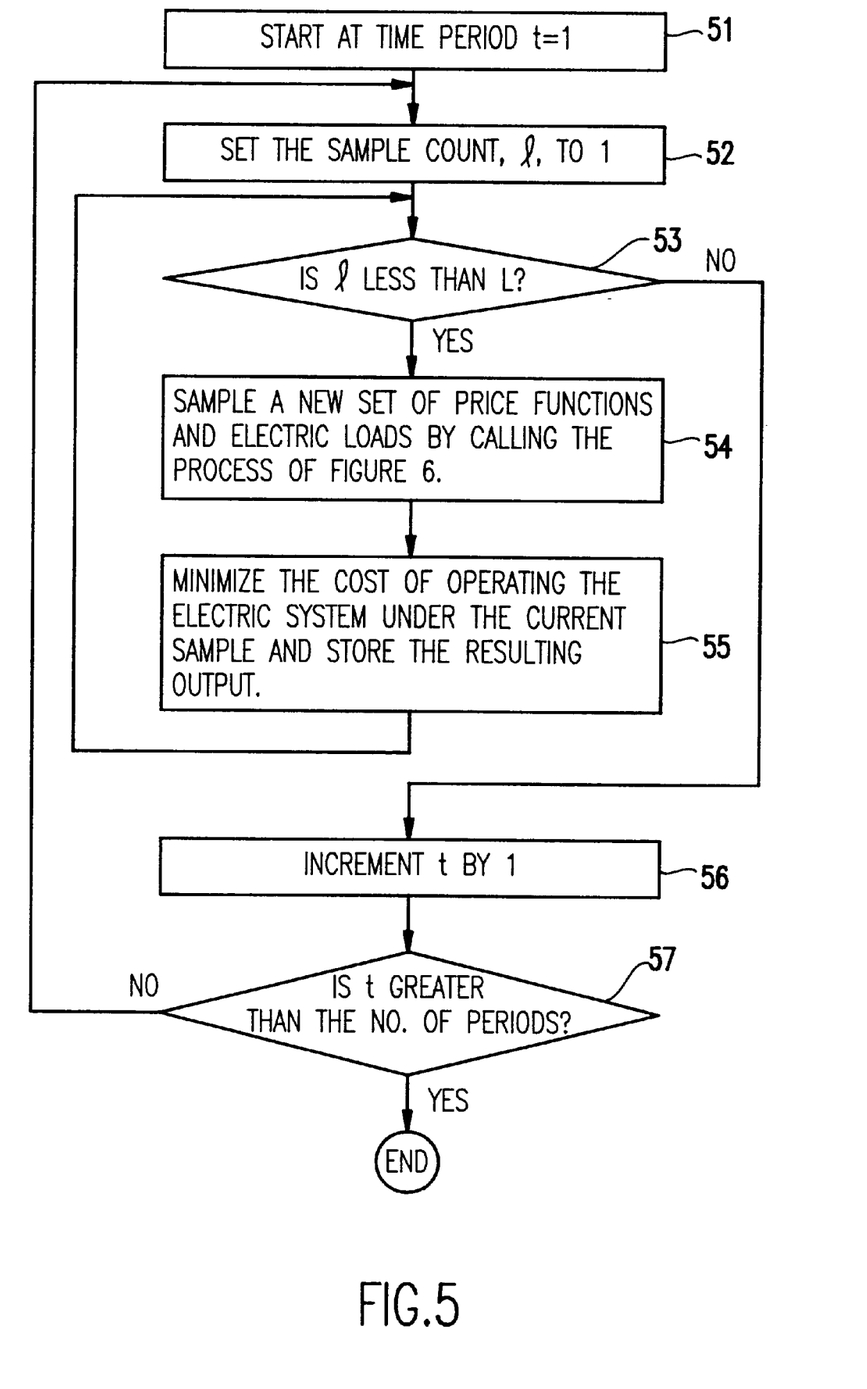
FIG. 5 is a flow diagram of the simulation used in the process according to the invention.

The flow chart of FIG. 5 describes the sampling process. It starts in function block 51 in which the time index, t, is set to 1. The process then proceeds to function block 52 in which the sample counter, l, is set to one. Note that whenever we select a new sample, i.e., price functions, transmission costs, and transmission capacities, the value of l is incremented by one (function block 56). In decision block 53, we check if we have reached the maximum number of samples, L. If the answer is yes, i.e., l=L, then the process proceeds to decision block 56 in which we move to a new time period in the planning horizon. If l≦L, then the process moves to function block 54 in which a new set of price functions (one for each utility) and electric loads at the different nodes of the network is sampled. This step, function block 54, calls the sampling procedure of FIG. 6 which returns a set of price functions, electric loads, and transmission capacities and costs. The data are then used to construct the problem of minimizing (2) subject to the constraints of equation (3) and other system constraints. We do not discuss the solution process here. Any commercial package that supports quadratic programming could be used. As an output for the optimization, we obtain the amount of power flowing in the different lines of the network, $y^l_{(i,j),t}$, and the marginal costs, $\pi^l_{i,t}$, corresponding to equation (3) at the different nodes of the system. The process is then directed to function block 53 in which a new sample is generated. After reaching the maximum number of samples in decision block 53, the process moves to function block 56 in which the time counter, t, is incremented by 1. In decision block 57, if t≦T, then the process goes back to function block 52; otherwise, the process terminates. At the end of the process of FIG. 5, we have for each time period a set of L values for the spot-market prices at nodes i=1, . . . ,n. We also have a set of possible power flows between the different nodes in the transmission system.

Figure 6:
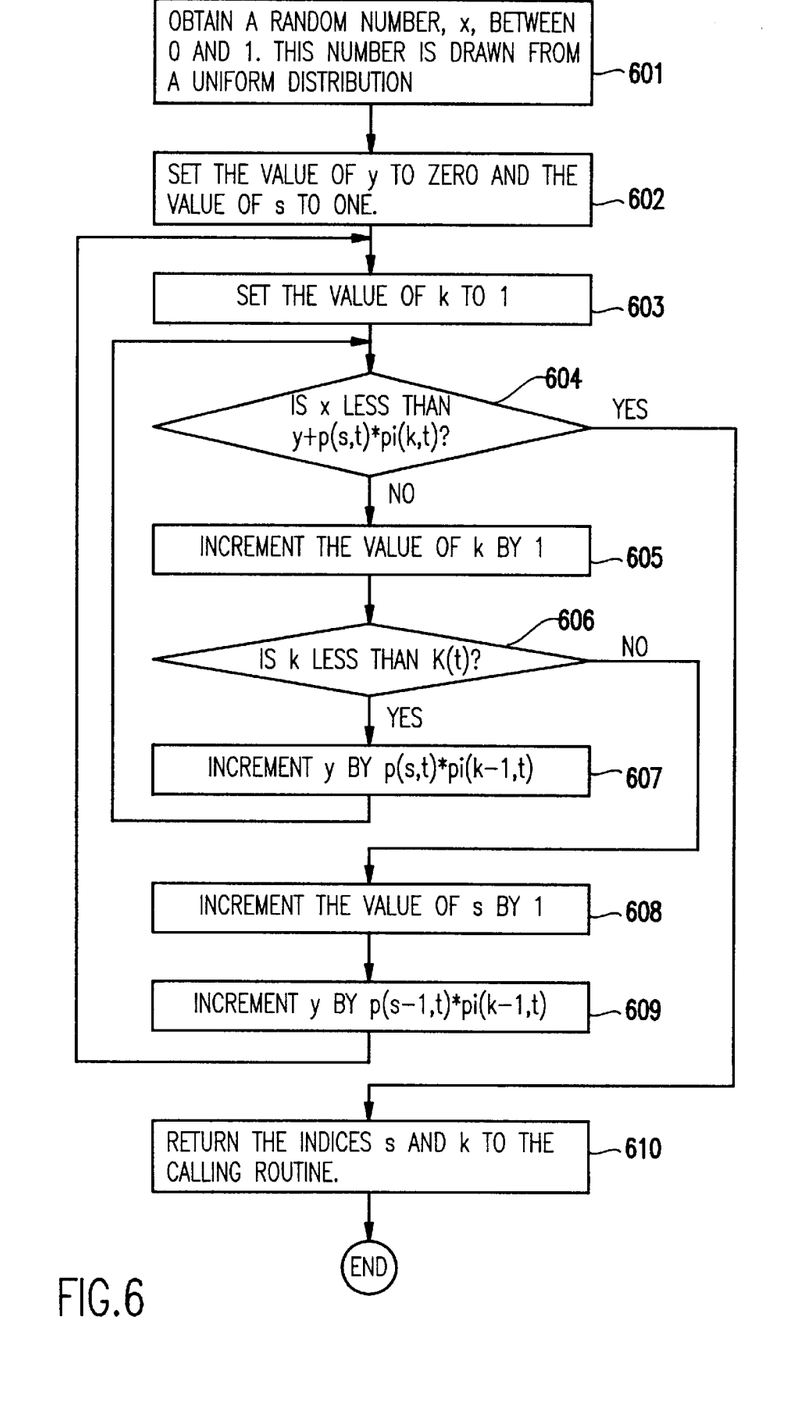
FIG. 6 is a flow diagram of a process that generates a random sample.

Note that function block 54 of FIG. 5 calls the process of FIG. 6 which performs the sampling. The sampling process is performed using a uniform random number generator. Uniform random number generators are available on most computers and under any programming language. For example, the C programming language provides the function rand as part of its standard library header. See B. W. Kernighan and D. M. Ritchie, *The C Programming Language*, Prentice Hall, 1988. The probability of the different scenarios, $p_s^t$, is used in conjunction with the electric-load probabilities, $\pi_t^k$, to come up with a sample. The process of FIG. 6 receives from the calling process (function block 54 of FIG. 5) the value of t. In function block 601, a random number x between 0 and 1 is sampled from the uniform distribution. Function block 602 defines a variable, y, and sets its value to zero. The variable y is used to compute the cumulative joint distribution at any given k and s. The value of the scenario counter, s, is set to 1. Function block 603 sets the value of k to 1. In decision block 604, the value of the cumulative probability, y, is compared to x. If x is less than or equal to y, then the functions $f_{i,t}^s$ and loads $d_{i,t}^k$ are returned to the calling routine (function block 54) to be used in the optimization problem. Otherwise, the value of k is incremented by 1 in function block 605. Decision block 606 checks if k has reached its maximum limit of $K_t$. If $k \leq K_t$, then the value of the cumulative probability, y, is increased by $p_t^s \pi_t^{k-1}$ and the execution is sent back to decision block 604. Otherwise, the value of s is increased by 1 in function block 608. Function block 609 updates the value of y by adding $p_t^{s-1} \pi_t^{k-1}$ to it. The execution then loops back to function block 603. Function block 610 is reached from decision block 604 when the value of x is less than the cumulative distribution at the point (k,s).

System's Output

At termination of the simulation runs, we have the spot prices or marginal costs, $\lambda^l_{i,t}$, at each point i, i=1, . . . ,n, and at each time period of the planning horizon. Here, the superscript l indicates the sample index. We also obtain the power flow, $y^l_{(i,j),t}$, in the different transmission lines of the power network. Note that if $y^l_{(i,j),t}$ is greater than zero, then node i is transmitting power to node j under sample l of our simulation. Of course, if $y^l_{(i,j),t}>0$, then $y^l_{(j,i),t}=0$. To get the probabilistic distribution of the spot-market prices, $\lambda^l_{i,t}$, we perform the following steps.

1. Create ranges for $\lambda^l_{i,t}$. For example, we may want to have intervals of $5/MWH width. That is, we have the intervals (0–5],(5–10],(10–15], . . . .

2. Count the number of $\lambda^l_{i,t}$ that falls within each range. We normalize these numbers to obtain a probability for each range.

3. The resulting histogram is an approximation of the probability distribution of the marginal cost at delivery point i at time t.

Figure 7:
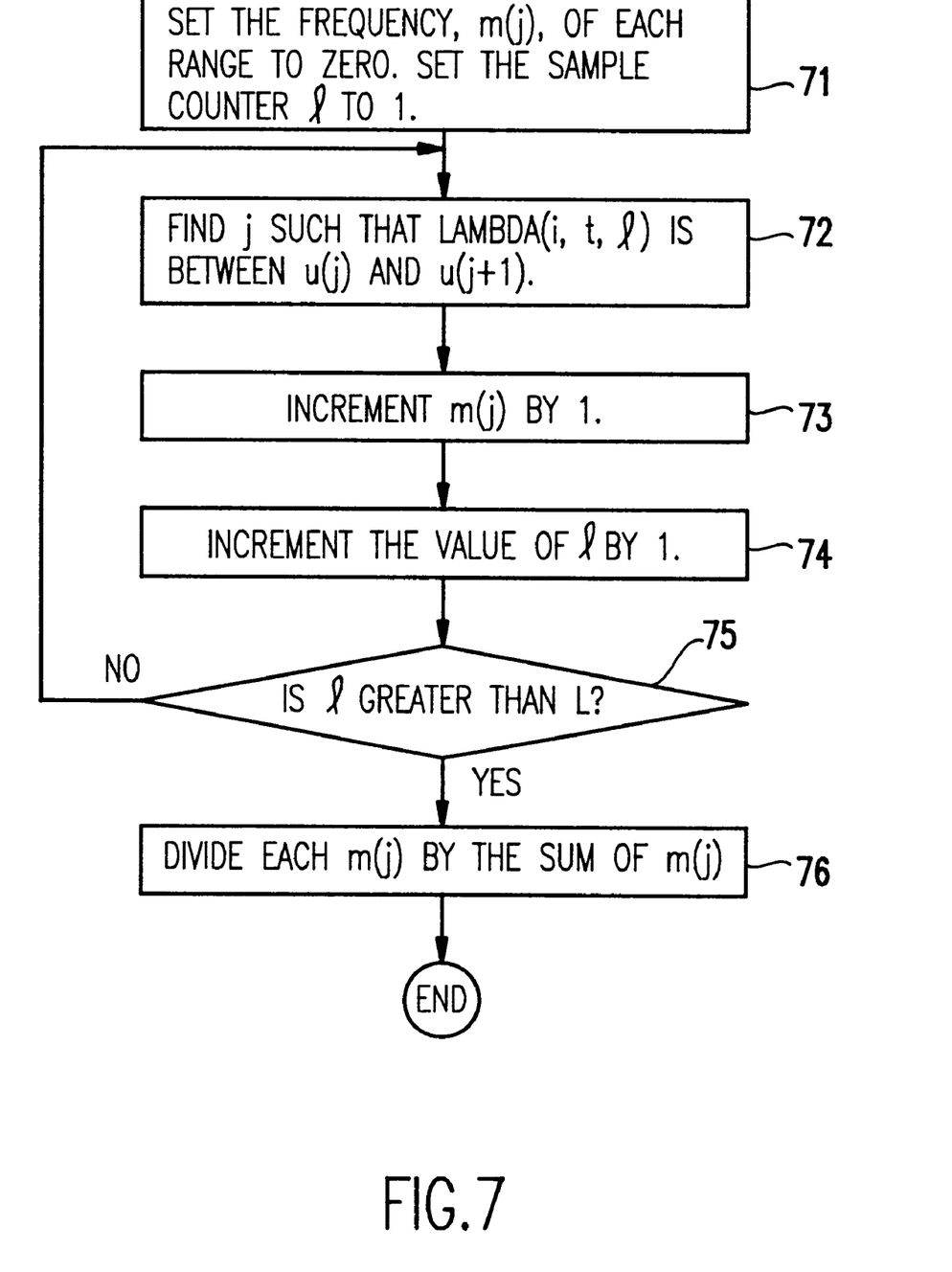
FIG. 7 is a flow diagram showing the bucketing process used to create a probabilistic distribution using the output of simulation runs.

The previous process is called bucketing and is described in the flow chart of FIG. 7. The process requires a number of buckets (i.e., ranges) which is defined by the user and the lower limit, $u_j$, of each range. We can assume that there is an extra range (after the last one defined by the user) that covers the range up to infinity. Function block 71 sets the number of observations (so far) in each range or bucket to 0. The process then moves to function block 72 in which the value of $\lambda^l_{i,t}$ is compared against the values of $u_j$ to find the index j for which $u_j \leq \lambda^l_{i,t} \leq u_{j+1}$. The value of the counter $m_j$ is incremented by 1 in function block 73 to account for sample j. Function block 74 increases the value of l by 1; i.e., we are ready to process a new sample if any. Decision block 75 checks if l is less than L. If this is the case, then we have more samples to study and the process moves back to function block 72. Otherwise, we completed classifying $\lambda^l_{i,t}$ into the appropriate buckets. Finally, function block divides the frequency, $m_j$, by L to obtain the relative frequency for each range or the probability.

We can follow similar steps to create probabilistic distributions for the amounts of power traded, $y^l_{(i,j),t}$, across the different power lines, (i,j). The resulting distributions can be helpful to the decision maker in deciding the amount of power to be generated and its price. For a power broker, these distributions can be used to sign buying and selling contracts with different suppliers and consumers.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer power trading and forecasting process for forecasting spot-market prices of electric power and trading transactions at different delivery points comprising the steps of:

inputting maximum generating capacities of each utility competing within the market, price functions at which a utility is willing to sell its power at a given time period, a weather forecast, and a transmission cost and transmission capacity in different power lines of the electrical system;

using probabilistic distributions of electric load and the price function of each utility and transmission cost and transmission capacity between different utilities to build probabilistic distributions for the spot-market prices and for electric trades in the system; and outputting probabilistic distributions for spot prices and trades at a plurality of time periods of a planning horizon and for a plurality of delivery points to enable a power broker to effectively manage risk in buying and selling electric power with different suppliers and consumers.

2. The computer power trading and forecasting process recited in claim 1 wherein the maximum generating capacity of each utility changes under different scenarios.

3. The computer power trading and forecasting process recited in claim 1 further comprising the step of using the input weather forecast to create a probabilistic distribution of load forecasts for each utility of interest.

4. The computer power trading and forecasting process recited in claim 3 wherein the input price functions are derived implicitly from production plus profit margin.

5. The computer power trading and forecasting process recited in claim 4 wherein a price function of a utility is approximated by a quadratic function which is convex, positive and increasing.

6. The computer power trading and forecasting process recited in claim 3 wherein the input price functions are given explicitly as a cost function of the generating units.

7. The computer power trading and forecasting process recited in claim 3 wherein probabilistic distribution of the transmission costs and capacities of power lines are created from historical data.

8. The computer power trading and forecasting process recited in claim 3 wherein the probabilistic distribution for the spot-market prices and for electric trades in the system are created by sampling from electric-load, price functions and cost distributions to create a sequence of deterministic models.

9. The computer power trading and forecasting process recited in claim 8 further comprising the steps of:

minimizing a cost of operating an electric utility system under each sampled set of price functions, transmission costs and electric loads; and storing a resulting output.

10. The computer power trading and forecasting process recited in claim 9 wherein sampling from electric-load, transmission costs and cost distributions is performed using a random number generator.

11. The computer power trading and forecasting process recited in claim 3 wherein the probabilistic distributions for spot prices and trades is performed by a bucketing process.

12. The computer power trading and forecasting process recited in claim 11 wherein the bucketing process comprises the steps of:

creating ranges of spot prices;

counting a number of spot prices that fall within each range and normalizing the counted numbers to obtain a probability for each range; and generating a histogram of the probabilities of each range as an approximation of a probability distribution of the marginal cost at each delivery point at a given time.

* * * * *